(12) United States Patent
Eberle et al.

(10) Patent No.: US 9,809,400 B2
(45) Date of Patent: Nov. 7, 2017

(54) METHOD FOR THE PARTIAL EMPTYING OF BUOYANT OBJECTS AND DEVICE FOR CARRYING OUT THE METHOD

(71) Applicant: LTW Intralogistics GmbH, Wolfurt (AT)

(72) Inventors: Konrad Eberle, Bregenz (AT); Urs Gerber, Bregenz (AT); Christian Baldauf, Doren (AT); Thomas Tumler, Hard (AT)

(73) Assignee: LTW Intralogistics GmbH, Wolfurt (AT)

( * ) Notice: Subject to any disclaimer, the term of this patent is extended or adjusted under 35 U.S.C. 154(b) by 0 days.

(21) Appl. No.: 14/628,763

(22) Filed: Feb. 23, 2015

(65) Prior Publication Data

US 2015/0239683 A1    Aug. 27, 2015

(30) Foreign Application Priority Data

Feb. 24, 2014 (EP) .................................... 14156309

(51) Int. Cl.
*B65G 53/32* (2006.01)
*B65G 53/02* (2006.01)
(Continued)

(52) U.S. Cl.
CPC .............. *B65G 53/02* (2013.01); *B65B 69/00* (2013.01); *B65G 53/66* (2013.01); *B65G 65/005* (2013.01);
(Continued)

(58) Field of Classification Search
CPC .... B65G 65/23; B65G 2201/06; B65G 53/32; B65G 2201/047; B65G 2203/0266
(Continued)

(56) References Cited

U.S. PATENT DOCUMENTS 2,704,614 A * 3/1955 St. John et al. ......... A21B 3/18
                                                   198/404
2,799,540 A * 7/1957 Makinson .............. B65G 51/01
                                                    406/94
(Continued)

FOREIGN PATENT DOCUMENTS

EP      0 167 082 A2    1/1986
EP      0 425 331 A1    5/1991
(Continued)

*Primary Examiner* — Joseph Dillon, Jr.
(74) *Attorney, Agent, or Firm* — Muncy, Geissler, Olds & Lowe, P.C.

(57) ABSTRACT

A method for the partial emptying of buoyant objects, which are stored in a loading aid having at least one opening is provided. A processing weight to be partially emptied is established. A fill weight is determined of the objects in the loading aid via a first weighing. The loading aid is at least partially immersed in a liquid bath. The loading aid is positioned or moved for a retention time predefined as a function of the fill weight and of the processing weight in the bath such that there is an on-average constant flow relative to the loading aid and such that the opening is disposed at least partially below a fill level surface of the bath, whereby the objects are taken along by the flow. The at least partially emptied loading aid is lifted out of the bath after the retention time has elapsed.

9 Claims, 5 Drawing Sheets

(51) Int. Cl.
  *B65B 69/00* (2006.01)
  *B65G 53/66* (2006.01)
  *B65G 65/00* (2006.01)
  *B65G 65/02* (2006.01)
  *G01G 17/00* (2006.01)
  *G01G 19/00* (2006.01)

(52) U.S. Cl.
  CPC ............ *B65G 65/02* (2013.01); *G01G 17/00* (2013.01); *G01G 19/00* (2013.01); *B65G 2201/047* (2013.01); *B65G 2203/0266* (2013.01); *B65G 2203/042* (2013.01); *B65G 2814/0326* (2013.01)

(58) Field of Classification Search
  USPC ............... 406/197; 198/418.6, 706; 414/418
  See application file for complete search history.

(56) References Cited

U.S. PATENT DOCUMENTS

| | | | | |
|---|---|---|---|---|
| 2,824,665 | A * | 2/1958 | Lamouria | A23N 4/04 198/453 |
| 2,894,516 | A * | 7/1959 | Froehlich | B65G 51/01 134/62 |
| 3,499,687 | A * | 3/1970 | Ellis | A23N 4/14 406/106 |
| 3,643,400 | A * | 2/1972 | Barbet | B65B 25/045 53/248 |
| 3,704,041 | A * | 11/1972 | Loveland | A23N 4/14 137/575 |
| 3,752,314 | A * | 8/1973 | Brown | B65G 53/30 209/173 |
| 3,779,410 | A * | 12/1973 | Phillips | B65G 35/06 414/415 |
| 3,822,015 | A * | 7/1974 | Hsieh | B03B 5/28 209/10 |
| 3,918,116 | A * | 11/1975 | Valdespino | A23N 12/02 15/3.13 |
| 4,039,090 | A * | 8/1977 | Desourdy | B65G 47/58 198/706 |
| 4,320,995 | A * | 3/1982 | Tennes | B65G 53/30 406/106 |
| 4,932,513 | A * | 6/1990 | Michimae | B65G 47/1471 198/397.06 |
| 5,242,250 | A * | 9/1993 | Compagnoni | B65B 25/045 141/70 |
| 5,248,045 | A * | 9/1993 | Alvelda | B03B 5/28 198/493 |
| 5,393,190 | A * | 2/1995 | Vickary | B65G 65/23 187/226 |
| 6,224,315 | B1 * | 5/2001 | Van Arkel | B65B 69/00 414/403 |
| 6,293,407 | B1 * | 9/2001 | Bajema | A23N 12/023 209/172.5 |
| 6,616,385 | B1 * | 9/2003 | Raginskii | B65G 35/00 406/85 |
| 6,655,878 | B1 * | 12/2003 | de Vos | A23N 3/00 406/198 |
| 6,840,715 | B2 * | 1/2005 | Crovara Pescia | B65G 51/01 406/198 |
| 7,361,282 | B2 * | 4/2008 | Smullin | B01D 17/00 210/703 |
| 7,674,077 | B2 * | 3/2010 | Opatril | B65G 51/01 406/106 |
| 8,109,698 | B2 * | 2/2012 | De Greef | B65G 51/01 406/106 |
| 8,821,078 | B2 * | 9/2014 | Hockett | B65G 47/684 111/175 |
| 8,839,712 | B2 * | 9/2014 | Stousland | A23L 1/01 406/144 |
| 8,926,260 | B2 * | 1/2015 | Parslow, II | B65B 25/02 414/419 |
| 9,073,707 | B2 * | 7/2015 | Ruissen | B65G 51/01 |
| 9,216,864 | B1 * | 12/2015 | Plessius | B65G 51/01 |
| 9,359,151 | B2 * | 6/2016 | Hockett | B65G 47/684 |
| 2004/0094390 | A1 * | 5/2004 | Bierschenk | B65G 17/123 198/706 |
| 2009/0285642 | A1 * | 11/2009 | De Greef | B65G 51/01 406/12 |
| 2015/0239683 | A1 * | 8/2015 | Eberle | B65G 53/02 414/21 |
| 2015/0246358 | A1 * | 9/2015 | Benedetti | A23N 12/023 209/10 |

FOREIGN PATENT DOCUMENTS

| | | |
|---|---|---|
| FR | 2 661 163 A1 | 10/1991 |
| FR | 2 731 979 | 9/1996 |
| NL | 1006497 | 1/1998 |
| WO | WO 98/01380 A1 | 1/1998 |

* cited by examiner

METHOD FOR THE PARTIAL EMPTYING OF BUOYANT OBJECTS AND DEVICE FOR CARRYING OUT THE METHOD

This nonprovisional application claims priority under 35 U.S.C. §119(a) to European Patent Application No. 14156309.8, which was filed in Europe on Feb. 24, 2014, and which is herein incorporated by reference.

BACKGROUND OF THE INVENTION

Field of the Invention

The invention relates to a method for the partial emptying of buoyant objects and a device carrying out the method. Further, the invention comprises a method for calibrating a device for carrying out the method.

Description of the Background Art

Methods for emptying buoyant objects into a basin are known from the state of the art. The emptying of objects (e.g., bulk goods) into a basin offers the advantage that objects susceptible to impacts are not damaged. Thus, for example, machine parts with a susceptible surface or nature can be emptied gently. In so doing, the bath can be a special medium, for example, which, if applicable, provides the objects in addition with corrosion protection.

Further, however, in the sorting, storing, and packaging of fruit or vegetables as well, gentle processes are necessary which handle the products such that they are not damaged by the use of machines or by collisions with one another.

A method for emptying buoyant fruit and vegetables, particularly apples, pears, and tomatoes, out of a container is described in EP 1 007 455 A1, which corresponds to U.S. Pat. No. 6,224,315. To this end, during each emptying process a complete emptying of the loading aids, i.e., the box or container, by immersing the loading aid in a basin is provided by a pouring out movement, e.g., in the form of tilting within the basin. In order to remove only a specific, i.e., limited number of apples, additional detection devices such as light beams, cameras, or the like must be used at the emptying stations to detect the emptied apples. If then only a partial amount of the apples in the container is to be processed, the container nevertheless is completely emptied in the basin. Only subsequently by additional, very complex devices it is assured that only the actually needed portion of the apples is transported further and/or processed further.

SUMMARY OF THE INVENTION

It is therefore an object of the present invention to provide a method, a device for carrying out the method, and a method for calibrating the device for a partial emptying of buoyant objects from a loading aid to be realized.

The object is attained, in an embodiment, by a method for the partial emptying of buoyant objects, which are stored in a loading aid having at least one opening, the method includes the steps: establishing a processing weight to be partially emptied; determining a fill weight of the objects in the loading aid via a first weighing; at least partially immersing the loading aid in a liquid bath; positioning or moving the loading aid for a retention time, predefined as a function of the fill weight and of the processing weight, in the bath such that there is an on-average constant flow relative to the loading aid and that the opening is disposed at least partially below a fill level surface of the bath, whereby the objects are taken along by the flow; and lifting the at least partially emptied loading aid out of the bath after the retention time has elapsed.

The method satisfies the long-standing need for performing a reliable partial emptying of a loading aid based on the dependence of the retention time on the fill weight, on the one hand, and on the processing weight, on the other. It is not necessary to empty the loading aid completely, which can be configured in the form of a load carrier, a box, a small load carrier (SLC), or also in the form of a lattice box. Based on the dependence of the retention time on the loading aid fill weight and its dependence on the processing weight to be partially emptied, the time period is predetermined for which the loading aid must remain in the bath in order to raise the buoyant objects to the surface of the bath and to allow them to be transported away by the flow. In this regard, the flow must be constant on average (average value of its flow velocity), i.e., averaged, e.g., over the retention time. Thus, it must be considered, on the one hand, that the loading aid is moved in the bath opposite to the emptying direction, whereby a constant flow relative to the loading aid to be partially emptied is realized. In so doing, a starting and/or braking motion (acceleration) of the loading aid occurs simultaneously in the bath in the horizontal direction.

Likewise, it is possible, on the other hand, that a constant flow is produced with the aid of a pump (circulation pump) in the bath, as a result of which during the immersing and lifting process the loading aid goes through a vertical motion exclusively.

The more fully the loading aid is loaded with the objects, the greater the acting buoyancy force on the buoyant objects, because the buoyant objects stored further below in the loading aid additionally press the objects above them upwards. The buoyancy force corresponds here to the weight of the liquid, displaced by the buoyant items, in the bath (Archimedes' principle). The more liquid of the bath is displaced, the greater therefore the uplift of the buoyant objects. The buoyancy force is defined as the product of the volume of the displaced liquid, the density of the liquid, and local or gravitational acceleration g. An object is buoyant when its weight is the same or less than the weight of the displaced liquid. The weight of the object is defined as the product of its mass, its density, and local acceleration g. The mass of the object is defined in turn as the product of the density of the object and the volume.

If therefore only a small processing weight (e.g., 20 kg) is to be emptied, based on the higher buoyancy force the retention time is shorter with a greater fill weight (e.g., 200 kg) than with a low fill weight (e.g., 70 kg). In other words, a processing weight, to be partially emptied, is therefore emptied more rapidly if the loading aid is very full compared with a nearly empty loading aid.

It is also possible in addition to determine the retention time as a function of the caliber or diameter, i.e., as a function of the determined dimensions of the objects. This leads to poorer results, however, with respect to the emptying amount for fruit or vegetables, because these while having the same dimensions nevertheless may have another or a different density. This results in a nonuniform buoyancy behavior in a liquid.

It has therefore proven preferable within the scope of the invention to determine the retention time at least before the step of partially immersing the loading aid by the steps of: determining an average emptying weight for the objects based on a time unit depending on the fill weight; comparing the average emptying weight with the processing weight; and determining a multiple of the time unit corresponding to the retention time.

A type of average emptying rate can be determined by these steps for the partial emptying (for example, an average emptying weight in kilograms per unit time in seconds). For an emptying of apples, for example, an average emptying weight of 15 kg and a time unit of 1 second are typical, which produces an average emptying rate of 15 kg per second. If, therefore, for example, the processing weight, to be partially emptied, is set at 60 kg, then a retention time of 4 seconds is obtained, i.e., a 4-fold multiple of the time unit of a second. For example, a detection device, which measures the time interval necessary for a complete emptying of the loading aid and is known from the state of the art, can be used to determine the average rate. If an average emptying rate is known, then it is also possible to determine for how many time units the loading aid must remain immersed in order to empty a specific processing weight (emptying mass or emptying weight). The average emptying weight for the objects based on a time unit can be determined further empirically depending on the fill weight (optionally again by a complete emptying of a greater or smaller fill weight), because a greater fill weight results in a more rapid emptying because of the greater buoyancy. Thus, for the partial emptying of apples, for example, an average emptying rate of 15 kg per second would be conceivable for a very full box and an average emptying rate of 8 or 10 kg per second for an only slightly filled box. In this case, 8, 10, and 15 kg constitute the average emptying weight and the second the time unit. The average emptying rate is adjusted after a predetermined number of runs, preferably between 3 to 10 runs, preferably precisely after 5 runs.

In order to be able to make a still more specific assessment of the average emptying weight, the following steps can be carried out as well determining an average weight for the objects stored in the loading aid and determining the average emptying weight further as a function of the average weight.

The average weight for the objects stored in the loading aid can be measured before placement of the objects in the loading aid. In the case of a fruit, particularly apple sorting, this can occur, for example, as follows: Each apple is weighed before placement in the loading aid, whereby therefore its weight is determined. Further, with the use of a camera system several pictures of each apple are taken in order to determine its dimensions, its color, and its quality. In addition, if applicable, damage to the apples can also be detected at the same time. The detected apples are divided into classes based on the aforementioned parameters. Apples that are grouped in the same class are typically placed in the same box (loading aid). In so doing, it is possible to count how many apples each of which have a specific weight were placed in the box. The average weight can then be calculated from the plurality of measured values for the weight of the apples stored in the box. It is also possible in this case that the fill weight of the particular loading aid is determined in this process, whereby therefore the sequence of steps A) and B) of the method of the invention need not be followed strictly. It should be noted in addition that a more precise or finer classification of the retention time as a function of the fill weight and as a function of the processing weight, to be partially emptied, can be determined in addition with the determined average weight.

In order to also assure a reliable partial emptying of the loading aid, it has proven especially preferable if during the immersing and positioning (steps C) and D)), the loading aid is rotated by an angle predefined as a function of the fill weight and as a function of the processing weight. This facilitates in addition that the buoyant objects can leave via an opening over an upper edge of a loading aid. In addition, tilting of the loading aid in a removal direction assures that no objects swim or are emptied backwards, i.e., opposite to the removal direction. In a further advantageous embodiment, the angle can also be predefined as permanent or fixed such that there is no dependence on the fill weight and/or the processing weight.

It has proven advantageous, further, if the loading aid runs through an infinitely variable rotation movement around a predefined angle in the bath, because due to said infinitely variable and particularly gentle movement the loading aid or other rotating parts exert no strong impacts on the buoyant objects.

It is also possible within an embodiment of the invention that the on-average constant flow is produced by a horizontal movement of the loading aid in the bath opposite to an emptying direction. The emptying direction is the direction in which the objects, to be partially emptied, are transported away. Thus, the bath can be formed in a simple manner as a tank or a basin, without an additional pump. The on-average constant flow for taking along the objects then arises by the movement of the loading aid in the bath opposite to the emptying direction.

In order to be able to check whether the processing weight, to be partially emptied was then also actually emptied, it has proven preferable for the method of the invention to comprise further the step of determining an actually emptied emptying weight via a second weighing.

In order to define still more precisely the retention time for future partial emptying processes, it is of advantage if the method further comprises the step of redetermining the retention time dependent on the fill weight for a new processing weight corresponding to the actual emptied emptying weight.

This assures that the retention time for emptying a processing weight corresponding to the actually emptied emptying weight at a fill weight established in step B) is very precise, if a new partial emptying with the same parameters is to occur.

In order to accelerate and to allow the process of partial emptying to proceed largely automatically, it has proven further as especially advantageous if the method further comprises the steps of picking up the loading aid filled with the buoyant objects at a transfer point at least before the step of determining a fill weight; and unloading the partially emptied loading aid at an unloading point at least after the step of lifting the loading aid.

The object related to the device is attained with a device for carrying out the method having a base frame, which is assigned a mobile carriage movable in its longitudinal direction, i.e., in the horizontal direction, which has a lifting carriage shiftable in the vertical direction, with a gripper for gripping a loading aid filled with buoyant objects, further with at least one weighing cell for weighing the loading aids gripped by the lifting carriage, and with a control computer, having a memory, for controlling the mobile carriage. The control computer for controlling the mobile carriage transmits signals wirelessly and/or in a hard-wired manner to the control of the mobile carriage and/or to the lifting carriage, said signals bringing about or resulting in a lifting or lowering movement of the lifting carriage. The loading aid can be weighed with the weighing cell, whereby the self-weight (tare weight) of the loading aid is subtracted by the control computer in order to determine the net weight as the actual fill weight from the gross weight. Said fill weight is stored in the memory which also contains a retention time as a function of the fill weight and as a function, for example, of a processing weight to be input via an input terminal. An input terminal is not absolutely necessary, because parameters predetermining the processing weight can also be transferred from a program; this occurs, for example, from a higher-level managing computer, which has a communication link with the control computer.

In an embodiment, the device can have a tank for a bath and a pump in the form of a circulation pump for producing a flow, preferably constant on average, in the bath. This assures that the circulation pump is controlled by the device control computer and produces a constant flow in the bath.

Conversely, it is also possible in an embodiment of the invention that a constant retention time and a flow dependent on the processing weight and the fill weight of the objects can be produced in order to realize a conveying away of the raised buoyant objects at different rates.

It has proven especially advantageous further if a sensor is provided for identifying an identification device disposed on the loading aid. For example, the type of buoyant objects, their density, their volume, and thereby their average weight are stored in this identification device. In addition, the fill weight can also be stored in the identification device. This identification device can be, for example, a barcode (EAN) or an NFC (near field communication) such as RFID (radio frequency identification, identification with the use of electromagnetic waves). For this reason, it has also proven especially advantageous, if the identification device contains an average weight of the buoyant objects stored within the loading aid. This average weight can be determined, for example, based on the already described measurement of the weight of each individual object and the subsequent averaging.

It is of advantage, if the lifting carriage comprises a device for rotating the loading aid. The loading aid during an immersing process can be pivoted thereby by a predefined angle; it can prevent thereby that, for example, buoyant objects are transported in the wrong direction in a transport channel. A further advantage is that the partial emptying process is accelerated by the tilting of the loading aid.

In order to be able to provide a largely automated method, the memory of the control computer comprises a database, in which a retention time needed for the processing weight, to be partially emptied, is stored, whereby the retention time is a function of the fill weight, determined via the at least one weighing cell, and the average weight determined via the sensor.

In order to enable a simple immersing or lifting of the loading aid, the device is formed as a box with a plurality of outlets for the passage of a liquid. These outlets do not offer any great resistance to the lifting carriage when it immerses the box in the bath.

It is also provided in an embodiment, a method for calibrating a device, whereby the calibration can include the steps of: partially emptying a minimum processing weight of objects from a more or less totally filled loading aid; partially emptying a maximum processing weight of objects from a more or less totally filled loading aid; and partially emptying the minimum processing weight of objects from a more or less empty loading aid.

The fill weight can be made up thereby of a sum of double the minimum processing weight, the maximum processing weight, and the residual weight and according to an embodiment constitutes between 250 kg and 350 kg, preferably between 260 kg and 280 kg, or precisely or about 270 kg.

The minimum processing weight is the weight that must be at least emptied in each partial emptying process, e.g., a weight between 1 kg to 15 kg, preferably between 8 kg to 12 kg, or precisely or about 10 kg. The maximum processing weight accordingly is the weight that can be maximally partially emptied, e.g., a weight between 180 kg and 220 kg, preferably 200 kg.

Three different retention times can be established thereby: a retention time at a very large fill weight and a very low processing weight to be partially emptied; further, a retention time at a large fill weight and a likewise large processing weight, and a retention time at a low fill weight and a low processing weight. In this case, it is therefore possible with only a single filled loading aid to calibrate the device such that it produces reliable results even in the first partial emptying processes, i.e., good agreements with respect to the established processing weight and the emptying weight actually emptied at the end.

It is likewise possible to use three independent loading aids for calibrating the device, whereby then a very full loading aid with a processing weight corresponding to the minimum processing weight is partially emptied; next, a likewise very full further loading aid with a processing weight corresponding to the maximum processing weight is emptied. Then a nearly empty, optionally third loading aid is partially emptied with a processing weight corresponding to the minimum processing weight. Calibration of the device can be achieved by this method as well.

Retention times for intermediate fill weights or processing weights can be extrapolated mathematically by establishing these three retention times. A still more precise definition of the retention times then occurs with a method that provides a new retention time definition after completion of a second weighing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
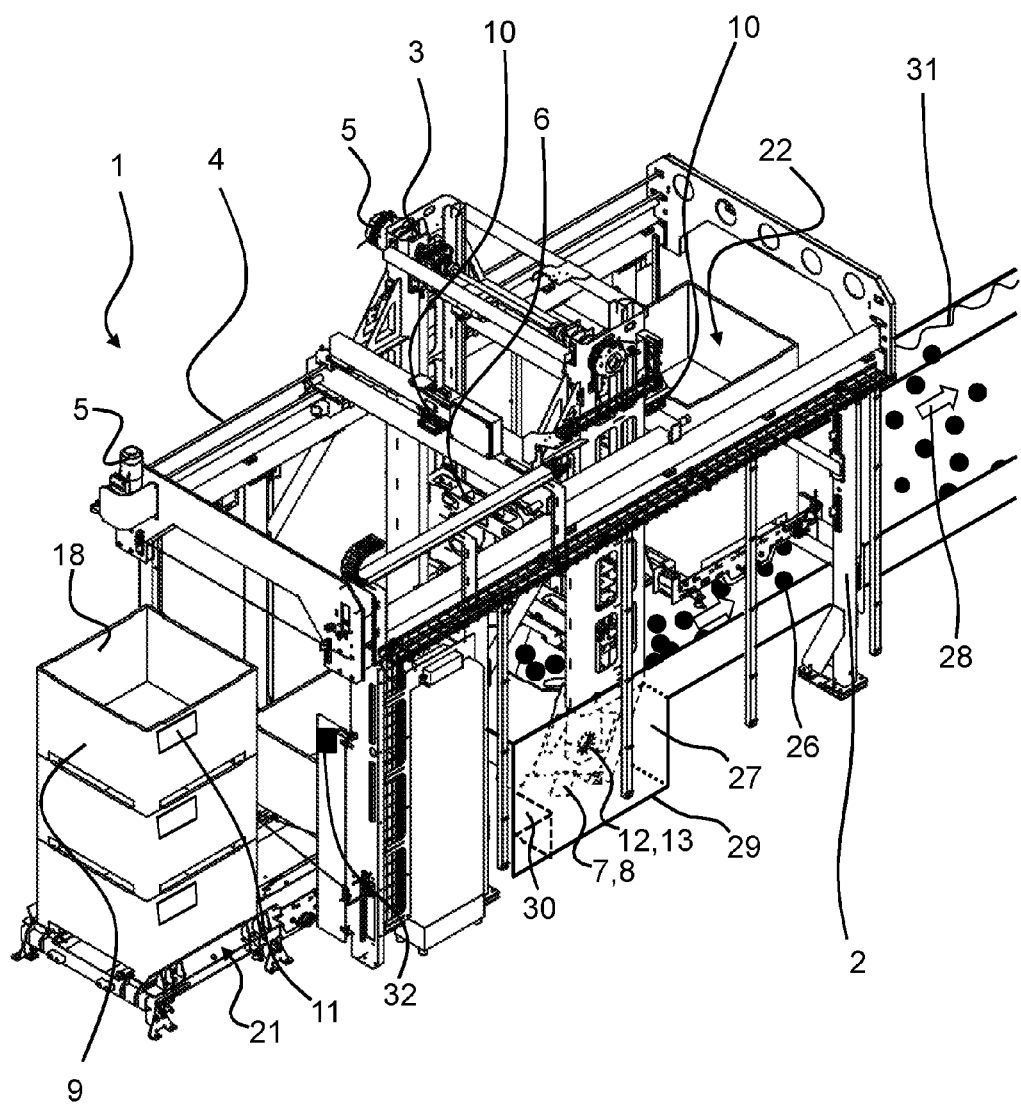
FIG. 1 shows a device for carrying out the method, in a perspective view.
Figure 2:
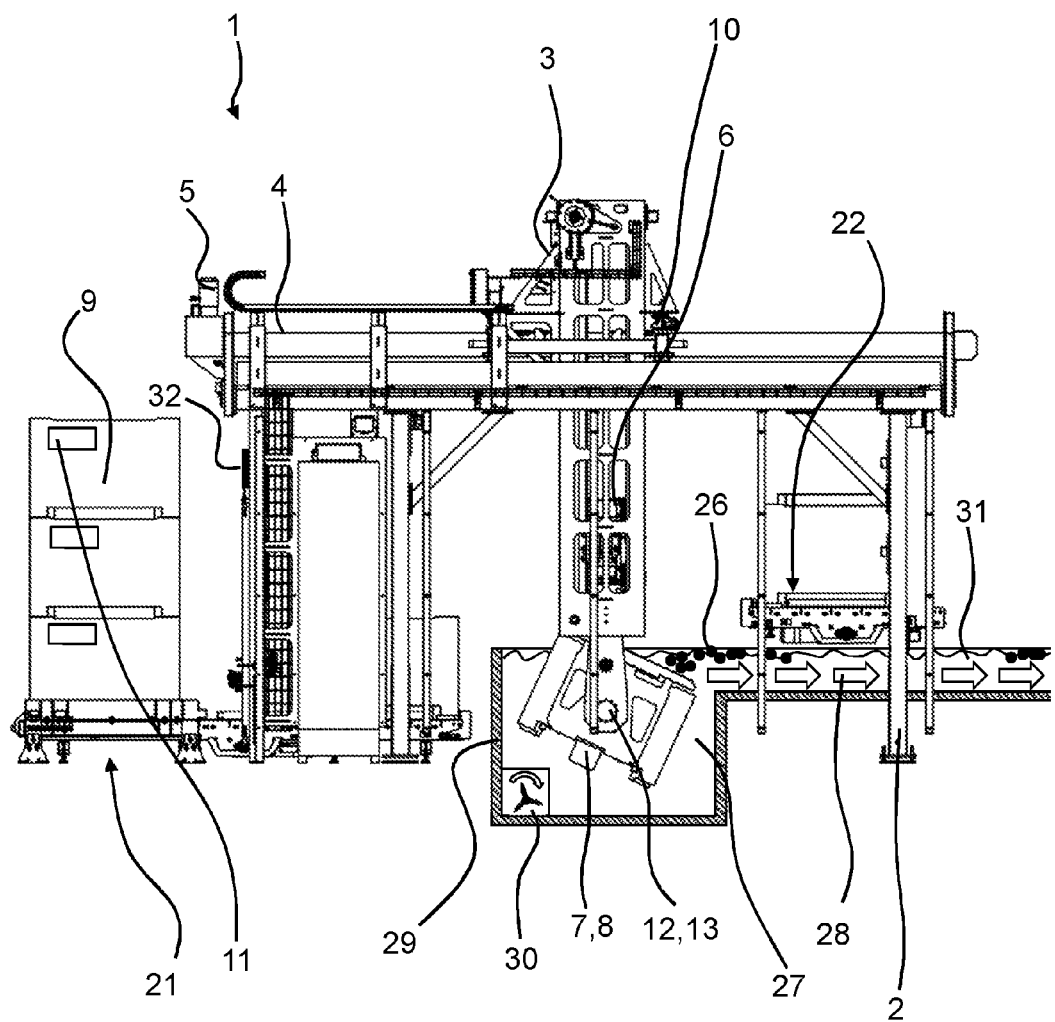
FIG. 2 shows a side view of the device according to FIG. 1.

FIGS. 1 and 2 show an emptying station 1 for emptying buoyant objects, here buoyant fruit such as, for example, apples. Said emptying station 1 is a device for carrying out the method of the invention.

It has a base frame 2 and a mobile carriage 3 disposed thereon, which is movable in its longitudinal direction. Mobile carriage 3 is disposed above on base frame 2 and moved along longitudinal guides 4.

It is also possible that a track system is arranged at the bottom, whereby mobile carriage 3 can then be moved along said system. In order to be able to move mobile carriage 3 in a longitudinal direction, motors 5, electric motors in the present case, are provided.

Lifting carriage 6 has a gripping device 7 for gripping a loading aid 9 filled with buoyant objects 26. At emptying station 1 according to the depicted embodiment, a gripping unit with a gripper 8 is provided, which can be opened and closed in order to grip loading aids 9 formed as boxes. Gripper 8, which has a communication link with the control computer, is assigned in addition a rotator 12 for a rotational movement. The rotary unit 13 has a rotary encoder, which has a signal connection with the control computer. Likewise, there is a signal connection between the control computer and mobile carriage 3 or with its lifting carriage 6. Emptying station 1 further has three weighing cells 10, which can weigh the gripped loading aid 9, whereby the precise fill weight 16 of the objects 26 stored in loading aid 9 is determined with the aid of the control computer. Weighing cells 10 or the scales are assigned to mobile carriage 3, preferably to lifting carriage 6 or gripper 8.

A sensor 32 for identifying identification device 11, disposed on loading aid 9, is provided on mobile carriage 3, or according to a further preferred embodiment on base frame 2. The employed sensor 32 is a scanner (e.g., barcode scanner or RFID scanner), which scans or reads identification device 11 and thereby determines the data with respect to the objects 26 stored in loading aid 9.

Further, emptying station 1 comprises a transfer point 21, where a stack of loading aids 9, in the present case a stack of boxes, can be transferred. In the shown exemplary embodiment, precisely three boxes are stacked one on top of the other. The height of the transferable box stack depends on the maximum possible lifting height of lifting carriage 6 or on the height of base frame 2. Therefore, within the scope of the invention a transfer point 21 is provided which provides for the stacking of a different number of boxes, for example, two or also four or more boxes. According to a further embodiment of the device, transfer point 21 is assigned at least one light sensor/light barrier, which is designed such that it can detect the number of loading aids 9 located at transfer point 21. One light sensor or light barrier can also be used per box. The dimensions of the loading aid are, for example, predetermined by a standard, from which the immersion depth for lifting carriage 6 can also be determined from the values provided in the standard. Transfer point 21 according to a further embodiment of the invention is assigned a loading aid scanner, which determines the number of boxes stacked at transfer point 21 and reports this to the control computer. In order to protect emptying station 1 from damage by a forklift during loading of transfer point 21, according to a further preferred embodiment the device is provided with impact protection.

Further, emptying station 1 comprises an unloading point 22 at which the partially emptied or totally empty boxes are taken off by gripper 8 of lifting carriage 6 and transported away from there. It is possible here as well to stack the (partially) emptied boxes.

Emptying station 1 according to a further embodiment comprises a height detector, for example, in the form of light barriers, which can detect the height of the box stack or also the size of the boxes, in order to sort out too large or too small boxes from emptying station 1 or in order to be able to calculate an appropriate immersion depth for loading aid 9 in the bath 27 via lifting carriage 6.

Transfer point 21 and/or unloading point 22 in the shown exemplary embodiment have conveyors, for example, belt conveyors or chain conveyors, by which the boxes can be transported in or out. These conveyors can be made from a rustproof material, such as stainless steel.

Further, a light curtain, which is realized from a plurality of light barriers and which can detect the interruption of each individual light barrier, can be provided at emptying station 1. Said light curtain represents a safety device to protect persons who enter the area of the travel path of the mobile carriage or the lifting carriage. An emergency stop of emptying station 1 is triggered when the light barrier is interrupted. A further embodiment manages without a light curtain. This then has, for example, conventional grates for protecting persons. Access to the travel area of mobile carriage 3 and lifting carriage 6 is then made possible via at least one access door. This is always necessary whenever maintenance or service work is to be performed at emptying station 1.

Figure 3:
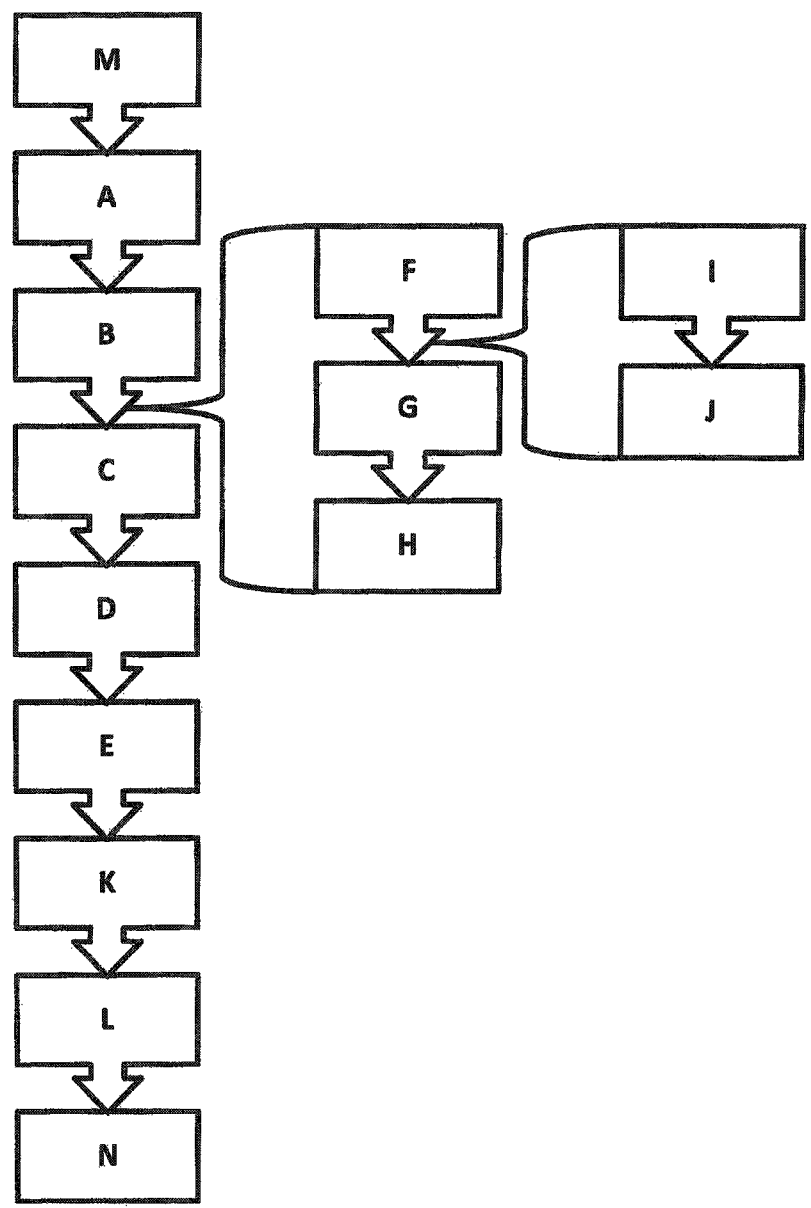
FIG. 3 shows a flow chart of the method of the invention.

The method of the invention and the method of the invention for calibrating an emptying station 1 according to FIGS. 1 and 2 will be described below with use of FIGS. 3 to 5. The method will be explained by using the flowchart located on the left in FIG. 3.

According to the preferred embodiment of the method, gripper 8 of lifting carriage 6 picks up the boxes, filled with the buoyant objects 26, from transfer point 21 (step M). To this end, mobile carriage 3 is moved to a transfer end position on the side of the transfer point. A processing weight 19, to be partially emptied, or the weight to be emptied is or was already established (step A)) by an input terminal or by the parameter transfer from a higher-level managing computer.

The average weight 17 of an individual object 26 in the box is determined with the sensor for identifying the barcode on the box (step I)). Average emptying weight 20 based on a time unit (average emptying rate) can be determined from this (step F)). Comparison of processing weight 19 with the time duration produces retention time 15, as will be described in greater detail below. Fill weight 16 of the objects 26 in loading aid 9 is determined with a first weighing via weighing cell 10 (step B)). A plurality of weighing cells 10 are provided in the shown exemplary embodiment. Preferably, precisely three weighing cells 10 are provided. Two of these weighing cells 10 are disposed laterally on mobile carriage 3 or also on lifting carriage 9 and one weighing cell 10 centrally or in the middle.

Mobile carriage 3 is then moved to an emptying position, which is located between the transfer end position and an unloading end position to the side of the unloading point. The box is then immersed in a water bath 27 according to a preferred embodiment (step C)), to which end the control computer or a control transmits a lowering signal, which results in a lowering movement of lifting carriage 6. The bath 27 is located in a tank 29 with a transport channel, connected thereto, for conveying away the emptied objects 26. A pump 30 (for example, a circulation pump) in communication with the control computer produces a constant flow in the bath 27.

The box during the lowering process is positioned in the bath 27 such that the objects 26 stored in the box rise to the surface and are transported away by the flow 28 of the liquid 31 in the bath 27. In this regard the box is kept in the bath 27 for a predefined retention time 15 (step D)).

The retention time 15 depends on fill weight 16 and on the initially established processing weight 19 to be partially emptied. A database 14, which is reproduced schematically in FIG. 5, is stored in the memory of the control computer. Tables that contain various retention times 15 are stored in said database 14. In this case, in the shown exemplary embodiment two different fill weight tables 23 are stored, each of which contain retention time 15 as a function of a specific processing weight 19 for a specific fill weight 16 or for a specific range of the fill weight 16 or for a specific range of the processing weight 19. It is also provided within the scope of the method that fill weight 16 is rounded up or down to an available nearby data point.

It is noted only by way of example at this point that it has proven useful for the partial emptying of apples to divide fill weight 16 into three ranges comprising fill weight 16 from 0 kg to 200 kg, the fill weight from 200 kg to 300 kg, and fill weight 16 from 300 kg to 400 kg.

Figure 4:
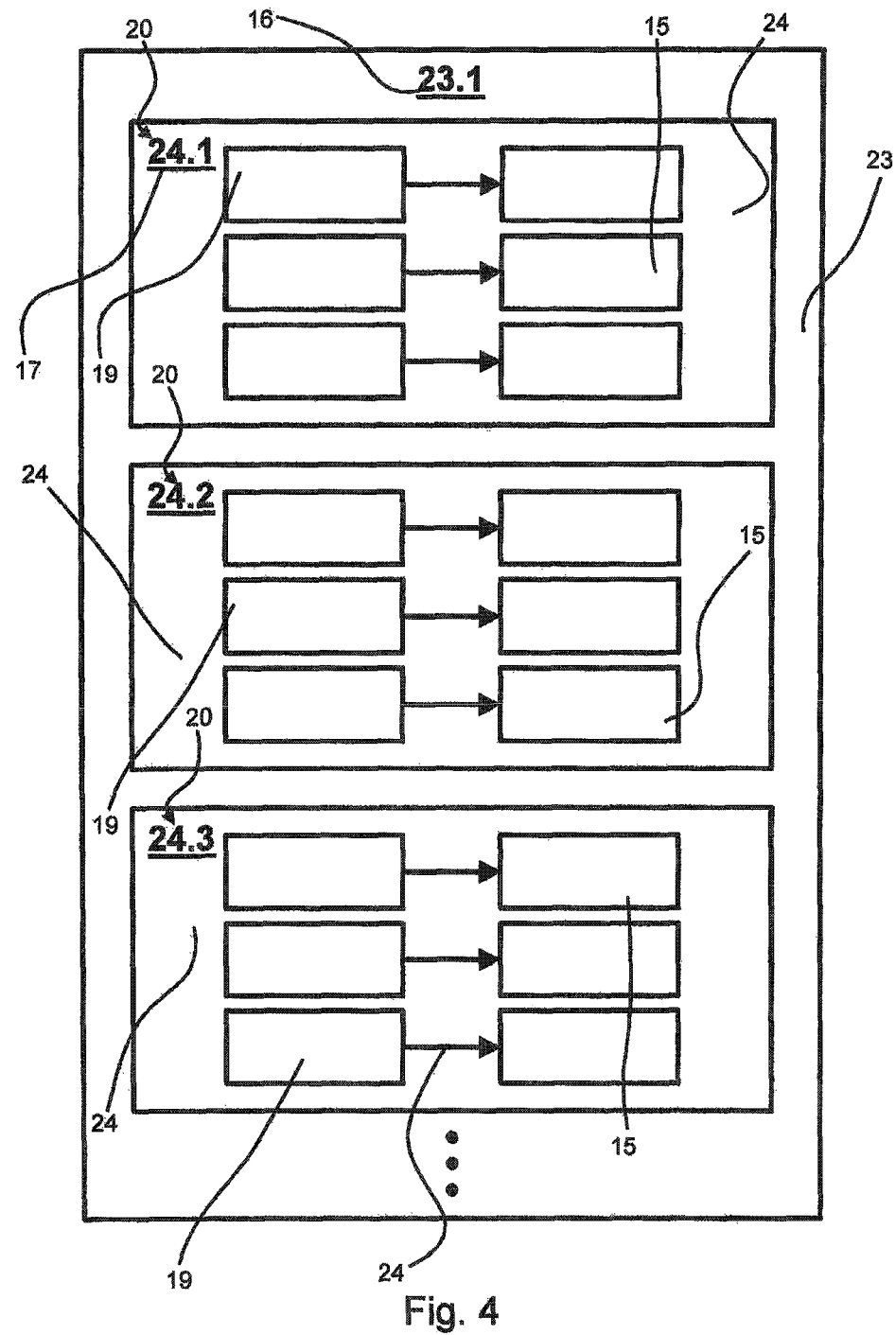
FIG. 4 shows a table contents of the database of the control computer.
Figure 5:
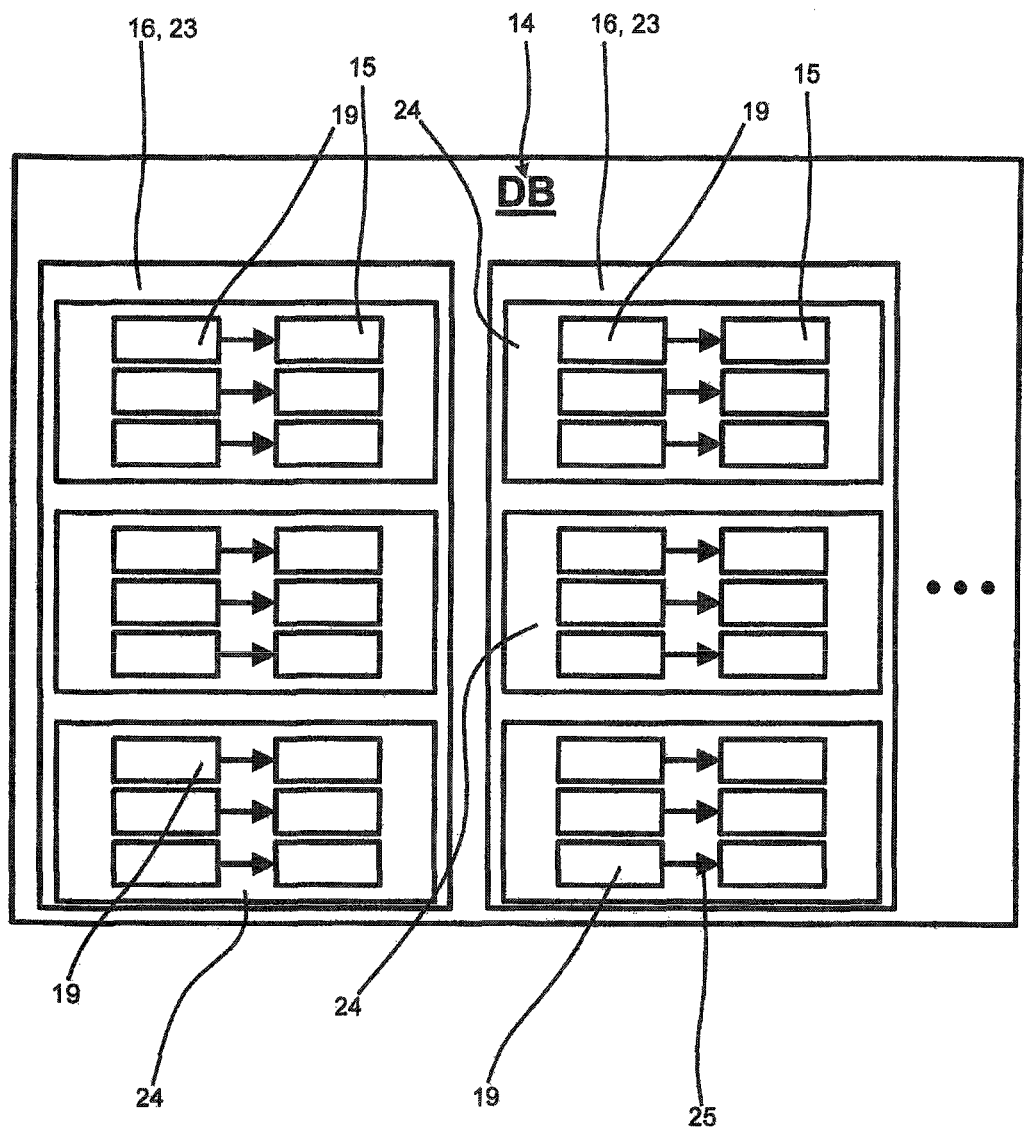
FIG. 5 shows an overview of the database of the control computer.

For each fill weight range, in the present example according to FIG. 4 and FIG. 5, further three average weight tables 24 (24.1; 24.2; 24.3) are stored, which represent average weight 17, or ranges of average weight 17 of the objects 26 contained in loading aid 9. These were measured previously and determined via the sensor. Naturally it is also possible that fewer or more than 3 tables are available for average weight 17 of the objects 26. Here as well, it is provided within the scope of the method that average weight 17 is rounded up or down to an available nearby data point.

It is noted only by way of example at this point that it has proven useful for the partial emptying of apples to divide average weight 17 into 25-g ranges starting at 100 g and ending at 400 g.

For each average weight table 24, there are a number of processing weights 19, indicative of a corresponding retention time 15, as is indicated by an arrow 25. In other words, therefore a value for retention time 15 of loading aid 9 in the bath 27 is provided by determining the input parameters or values (fill weight 16, average weight 17, processing weight 19) in database 14. Further, a rotation movement of the invention by the predefined angle of the box can also occur simultaneously, likewise depending on the aforementioned input parameters. The boxes are thereby partially emptied in a flowing rotational movement in the bath 27. In this regard, the angle can be predetermined as fixed or permanent, also independent of the degree to which the box is filled or of processing weight 19.

If retention time 15 in database 14 has passed, the control computer transmits a lift signal, which results in a lifting motion of lifting carriage 6. This then lifts loading aid 9 out of the bath 27 after the retention time 15 (step E)) has elapsed.

Next, a further, second weighing of loading aid 9 is carried out to determine the actual emptied emptying weight (step K)). In database 14, the value of retention time 15 is now overwritten or a new value is applied which is dependent on the determined fill weight 16, the determined average weight 17, and the actually emptied emptying weight. This emptying weight is available in a later partial emptying process as processing weight 19 in database 14 with a very precise retention time 15. Thus, a better result for the partial emptying can be achieved later with the same parameters (step L)). Next, the at least partially emptied loading aid 9 is transferred from lifting carriage 6 and from mobile carriage 3 at unloading point 22 (step N)). To this end, mobile carriage 3 is moved to the unloading end position and the box is taken off at unloading point 22 by a lowering movement of lifting carriage 6 and a movement that opens gripper 8.

A calibration method for a device for carrying out the method, which is carried out according to a preferred embodiment as a computer-implemented method, will be explained hereafter as part of the invention. It can manage without the aforementioned average rate. This method can also follow the method explained in claim 15.

To carry out the method, the device has a control computer, which has, for example, a user interface, a processor, and memory with a database 14, which for its part contains database tables, namely fill weight tables 23. Each fill weight table 23 contains average weight tables 24 for average weight 17 of the objects 26 contained in loading aid 9. Average weight tables 24 for their part contain tables with processing weights 19. A retention time 15 is associated with processing weights to be partially emptied 19 in the calibration method.

First, a loading aid 9 is weighed in a first weighing by which its fill weight 16 is determined. Then, the contents of loading aid 9 in a bath 27 are emptied for a specific time period. Next, how much was actually emptied is determined by a second weighing. Next, a corresponding entry is made in database 14. The time period is now the retention time 15 that is needed to empty the actually emptied emptying weight for a previously determined fill weight 16. Proceeding from the first time period, it can now be calculated (extrapolated linearly) how long the retention time is for a processing weight 19, when it represents a multiple of, the actually emptied weight of the first emptying process.

If at a later time a processing weight 19 is partially emptied, which is a multiple (for example, 1.1-fold) of the actually emptied emptying weight, the retention time 15 is calculated as follows: determination of a deviation of processing weight 15, to be partially emptied, compared with the prior actually emptied emptying weight; application of the average emptying rate to this deviation to determine a deviation time period. The retention time is made up of the previously known retention time of the actually emptied emptying weight and the deviation time period (e.g., 60 kg of the actual emptying weight corresponds to a 3 second retention time; now to be emptied: 40 kg; calculation of the deviation: 60 kg–40 kg=20 kg; calculation of the deviation time period: 20 kg/15 kg/s=1.33 s; calculation of the retention time for the partial emptying of 40 kg: 3 s–1.33 s=1.667 s). If it is then determined in the second weighing that the deviation between the desired processing weight 19 and the actually emptied emptying weight exceeds a predefined value, the previously selected value for retention time 15 is discarded, i.e., not stored. On the other hand, retention time 15 (the multiple of the time period) is again established for the actually emptied emptying weight. If the predefined value is not exceeded, the prior retention time 15 is stored for the multiple of processing weight 19. The database thereby becomes filled with values little by little by a plurality of partial emptying processes. The database then comprises values for processing weight 19, e.g., broken down into predefined steps, preferably into 10-kg steps. Retention time 15 for intermediate values between the individual steps is again calculated (linearly).

If the case were now to occur that a fill weight table 24 with a low fill weight 16 is already very full with values for retention time 15, but a further fill weight table 24 with a very high fill weight 16 is still relatively empty, a (nearly) full loading aid 9 can be partially emptied, in order to determine retention times 15, needed with regard to high fill weights 16. Said loading aid 9 can then also be partially emptied in a number of steps.

This also applies conversely if values for a low (or also average) fill weight 16 are missing.

An increasingly more precise emptying result can be achieved thereby with a number of (i.e., many) emptying processes. A learning, iterative partial emptying process is created thereby, which offers a still more accurate retention time 15 as a function of the input parameters.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for the partial emptying of buoyant objects, which are stored in a loading aid having at least one opening, via controls output by a control computer, the method comprising:
    establishing, by the control computer, a processing weight that is a weight of objects that is intended to be emptied out of the loading aid;
    determining, in a first weighing, a fill weight of the objects in the loading aid via at least one weighing cell;
    at least partially immersing the loading aid in water in a bath via a computer-controlled lifting carriage;
    positioning or moving the loading aid in the bath via the computer-controlled lifting carriage for a retention time, the retention time predefined as a function of the fill weight and of the processing weight, the positioning or moving of the loading aid in the bath performed such that there is an on-average constant flow of the water in the bath relative to the loading aid and such that the opening of the loading aid is disposed at least partially below a fill level surface of the water in the bath, wherein the positioning or moving of the loading aid in the bath during the retention time causes a portion of the objects to empty out of the loading aid and to be taken along by the flow of the water, the portion of the objects being an actually emptied emptying weight that was emptied out of the loading aid during the retention time; and
    lifting the at least partially emptied loading aid out of the bath via the computer-controlled lifting carriage after the retention time has elapsed.

2. The computer-implemented method according to claim 1, wherein the retention time is established by the control computer at least before the loading aid is immersed, the retention time established by the steps comprising:
    determining an average emptying weight for the objects based on a time unit depending on the fill weight;
    comparing the average emptying weight with the processing weight; and
    determining a multiple of the time unit corresponding to the retention time.

3. The computer-implemented method according to claim 2, wherein the method further comprises:
    determining an average weight for the objects stored in the loading aid; and
    determining the average emptying weight further as a function of the average weight.

4. The computer-implemented method according to claim 1, wherein the loading aid, when in the bath during the positioning or moving via the computer-controlled lifting carriage, is rotated by an angle predefined as a function of the fill weight and as a function of the processing weight.

5. The computer-implemented method according to claim 1, wherein the on-average constant flow is produced by a horizontal movement of the loading aid in the bath in a direction that is opposite to an emptying direction of the objects.

6. The computer-implemented method according to claim 1, wherein the method further comprises determining, in a second weighing, the actually emptied emptying weight via the at least one weighing cell.

7. The computer-implemented method according to claim 6, wherein the method further comprises redetermining the retention time dependent on the fill weight for a new processing weight corresponding to the actually emptied emptying weight.

8. The computer-implemented method according to claim 1, wherein the method further comprises:
    picking up the loading aid filled with the buoyant objects via the computer-controlled lifting carriage at a transfer point that is located at least before the at least one weighing cell that determines the fill weight in the first weighing; and
    unloading the at least partially emptied loading aid via the computer-controlled lifting carriage at an unloading point that is located at least after a position at which the loading aid is lifted out of the bath via the computer-controlled lifting carriage.

9. The computer-implemented method according to claim 1, wherein the retention time is stored on a database of the control computer.

* * * * *